US 7,619,338 B2

(12) United States Patent
Hamada (10) Patent No.: US 7,619,338 B2
(45) Date of Patent: Nov. 17, 2009

(54) BRUSHLESS AC GENERATOR FOR USE IN AUTOMOTIVE VEHICLE

(75) Inventor: Hiroshi Hamada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/071,252

(22) Filed: Feb. 19, 2008

(65) Prior Publication Data
US 2009/0026856 A1   Jan. 29, 2009

(30) Foreign Application Priority Data
Jul. 26, 2007   (JP)   ............................. 2007-194389

(51) Int. Cl.
    *H02K 5/00*   (2006.01)
(52) U.S. Cl. ........................... 310/89; 310/58; 310/263
(58) Field of Classification Search .................. 310/52, 310/58, 59, 89, 68 B, 263
See application file for complete search history.

(56) References Cited

U.S. PATENT DOCUMENTS

| 5,705,865 | A  | * | 1/1998 | Ishida et al. ................ 310/62 |
| 6,384,506 | B1 | * | 5/2002 | Kojima et al. ............... 310/194 |
| 6,417,585 | B1 | * | 7/2002 | Oohashi et al. .............. 310/58 |
| 6,433,457 | B1 |   | 8/2002 | Nakamura |
| 6,897,583 | B2 | * | 5/2005 | Doeffinger et al. ......... 310/68 D |
| 6,933,635 | B2 |   | 8/2005 | Kurahashi |
| 2002/0014807 | A1 | | 2/2002 | Murata et al. |

FOREIGN PATENT DOCUMENTS

| JP | 02-133053   | 5/1990 |
| JP | 04-117154   | 4/1992 |
| JP | A-07-231612 | 8/1995 |
| JP | 07-336974   | 12/1995 |
| JP | A-2001-292550 | 10/2001 |
| JP | 2002-112514 | 4/2002 |
| JP | A-2004-312884 | 11/2004 |

OTHER PUBLICATIONS

Japanese Examination Report mailed Apr. 28, 2009, pp. 1-6.

* cited by examiner

*Primary Examiner*—Quyen Leung
*Assistant Examiner*—Leda Pham
(74) *Attorney, Agent, or Firm*—Oliff & Berridge, PLC (57) ABSTRACT

A brushless AC generator is mounted on a vehicle such as a truck, a farming vehicle or a construction vehicle. The generator is composed of a housing, stator fixedly contained in the housing, a rotor, for supplying a magnetic field to the stator, rotatably supported in the stator, and other associated components including a voltage regulator and a rectifier. The housing is composed of a front housing and a rear housing. An outside fan is connected to a rotor shaft and disposed at a front side. Cooling air is introduced into the generator by the outside fan through windows formed in the rear housing. A fringe surface of the window facing a shoulder portion of the rotor is sloped, so that the cooling air is smoothly introduced along the sloped surface thereby to improve cooling efficiency.

2 Claims, 8 Drawing Sheets

FIG. 1

REAR SIDE ← → FRONT SIDE

REAR SIDE ⟷ FRONT SIDE

BRUSHLESS AC GENERATOR FOR USE IN AUTOMOTIVE VEHICLE

CROSS-REFERENCE TO RELATED APPLICATION

This application is based upon and claims benefit of priority of Japanese Patent Application No. 2007-194389 filed on Jul. 26, 2007, the content of which is incorporated herein by reference.

BACKGROUND OF THE INVENTION

1. Field of the Invention

The present invention relates to a brushless AC generator to be mounted on an automotive vehicle such as a truck, a construction vehicle or a farming vehicle.

2. Description of Related Art

Ambient temperature in which an AC generator is used is becoming high because an engine has been modified to improve exhaust gas quality. Further, electric power required for a vehicle is increasing to secure driving safety and comfort. A brushless AC generator has been used in vehicles such as trucks which are driven in a long distance and construction or farming vehicles which are used in a dusty environment. This is because the brushless AC generator is resistive to dust and has a long lifetime.

Generally, in such an AC generator, no window for introducing cooling air is formed in a housing to protect components from being damaged by foreign particles or water entering into the generator. Electric components such as a rectifier are protected by a sidewall of the housing and are cooled by a outside fan fixed to a rotor shaft. To meet a requirement for increasing an output of the generator, various measures, such as increasing a diameter and a thickness of a stator and decreasing resistance in windings, have been taken. Further, a counter measure has to be taken against a temperature rise due to increase in the generator power.

In the brushless AC generator, it is difficult to increase a diameter of the outside fan to increase its cooling ability because there is a limitation in the diameter of a size in a radial direction. There is also a limitation in increasing the number of blades and its area in the axial direction because a mechanical strength of the blades has to be taken into consideration. It is conceivable to make narrower a gap between cooling fins of a rectifier and a sidewall of the housing to increase cooling efficiency. However, if the gap is made narrow, a possibility of accumulation of foreign particles in the gap increases.

An example of the brushless AC generator disclosed in JP-A-2001-292550 includes cooling windows formed in a rear housing, and cooling air is introduced through the cooling windows into the generator by an outside fan disposed at a pulley side. However, there is a problem that cooling air is not smoothly introduced into the housing because a flow of the cooling air is disturbed or stagnated by a step or a gap between the rear housing and an axial end of a rotor. Further, in the case where such a gap is exposed to the cooling window, water or other liquid may enter the gap thereby causing various troubles.

SUMMARY OF THE INVENTION

The present invention has been made in view of the above-mentioned problem, and an object of the present invention is to provide an improved brushless AC generator, in which water or other liquid is prevented from entering into the generator while improving cooling efficiency.

The brushless AC generator is often used in a vehicle such as a truck, a farming vehicle or a construction vehicle. When the generator is used in a dusty environment, it is important to prevent foreign particles such as dusts and water from entering into the generator. The brushless AC generator includes a housing composed of a front housing and a rear housing, a stator is functioning as an armature contained in a housing, and a rotor rotatably supported in the stator for supplying a magnetic field to the stator.

The rotor has a rotor shaft, to which an outside fan for sucking cooling air into the housing and a pulley for driving the rotor by an engine are connected. The rear housing, which is disposed at a rear side opposite to a front side where the outside fan is positioned, includes a disc portion formed around a center hole, spokes extending in the radial direction from the disc portion, a cylindrical portion connected to an outer periphery of the spokes, and windows for introducing cooling air. The windows are defined by an outer peripheral end surface of the disc portion, the spokes and the cylindrical portion.

The rotor includes claw-shaped rotor poles which are circularly connected to each other, forming a shoulder portion. The disc portion of the rear housing faces a rear end surface of the shoulder portion, forming a small gag therebetween. The outer peripheral end surface of the disc portion is sloped, so that its diameter L2 at the front side is larger than its diameter L1 at the rear side. The cooling air introduced into the housing through the windows of the rear housing smoothly flows along the sloped surface toward the front side of the housing.

Preferably, the diameter L2 is set to fall in a range between an outer diameter $\Phi 1$ of the rear end surface of the shoulder portion and an outermost diameter $\Phi 2$ of the shoulder portion, i.e., $\Phi 1 \leq L2 \leq \Phi 2$. In this manner, a gap or step between the outer peripheral end surface of the disc portion and the rear end surface of the shoulder portion can be further reduced thereby to attain a smoother flow of the cooling air. The sloped surface may be formed by attaching a separate member to the outer peripheral end surface of the disc portion. The separate member may be extended in the axial direction beyond the rear end surface of the shoulder portion to thereby further reduce gap between the outer peripheral end surface of the disc portion and the rear end surface of the shoulder portion.

According to the present invention, cooling efficiency of the cooling air is improved while preventing water and other liquid from entering into the brushless AC generator. Other objects and features of the present invention will become more readily apparent from a better understanding of the preferred embodiment described below with reference to the following drawings.

DETAILED DESCRIPTION OF THE PREFERRED EMBODIMENT

Figure 1:
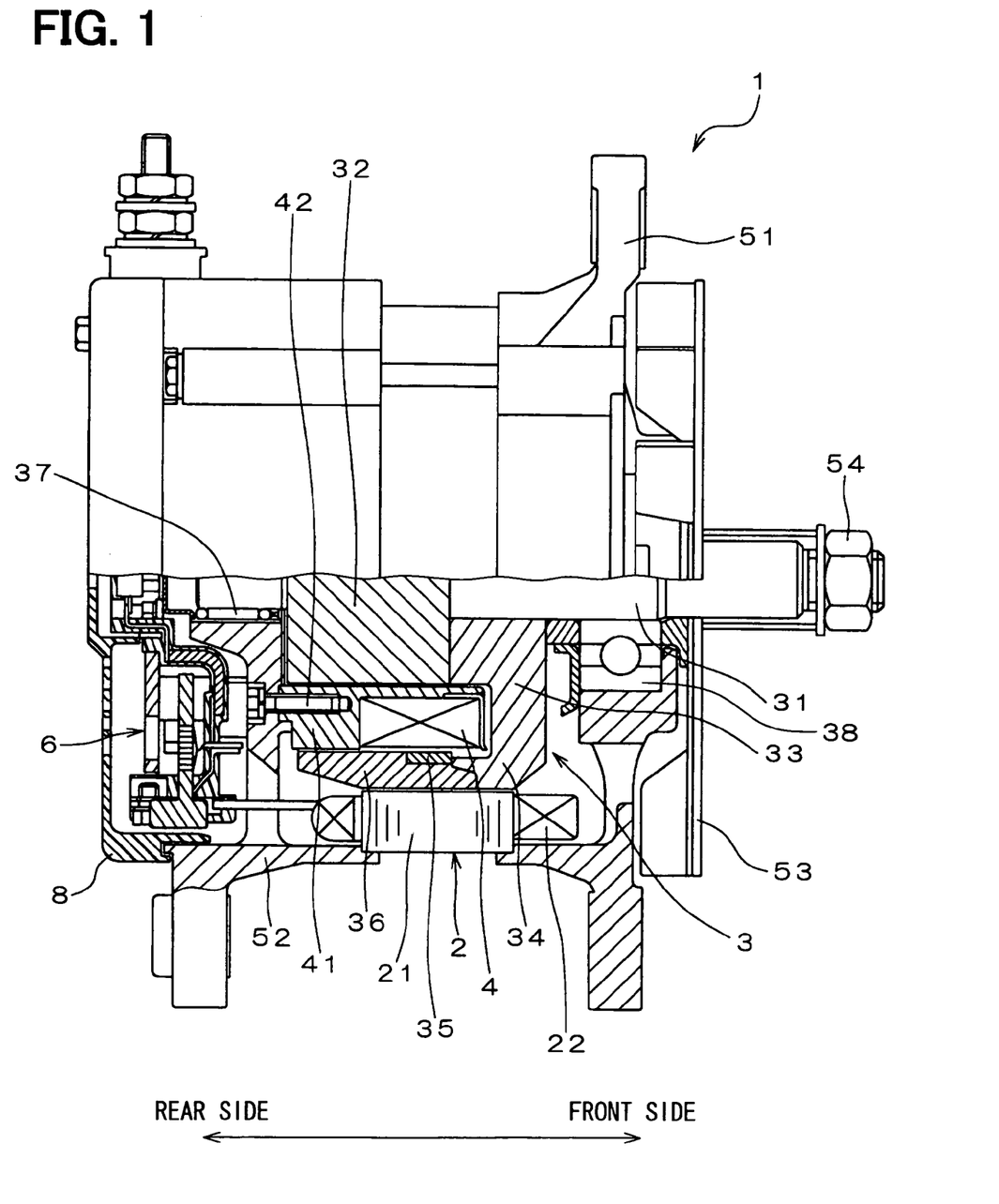
FIG. 1 is a cross-sectional view showing an entire structure of a brushless AC generator according to the present invention.
Figure 2:
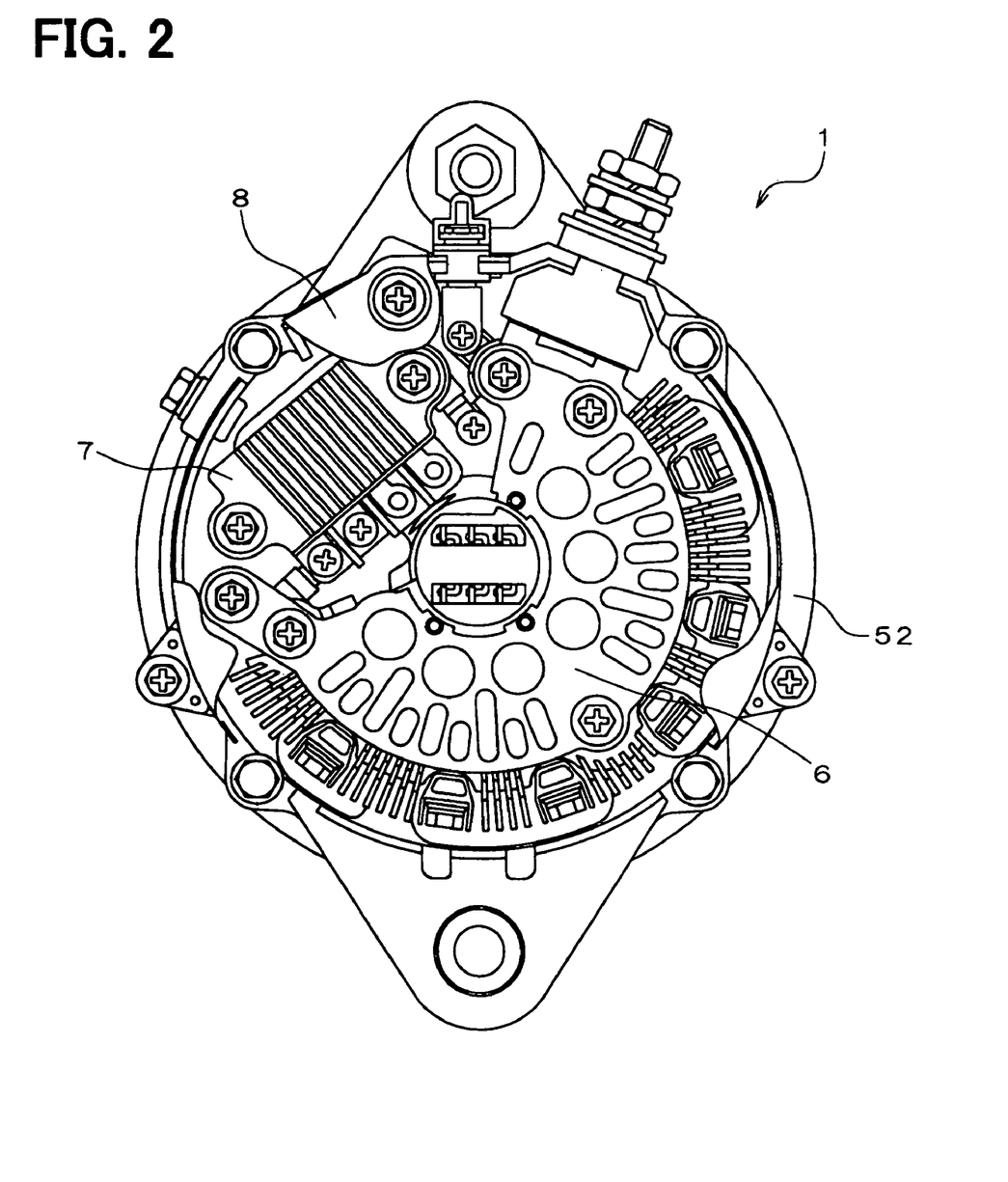
FIG. 2 is a plan view showing the brushless AC generator, viewed from its rear side indicated in FIG. 1.

A preferred embodiment of the present invention will be described with reference to FIGS. 1-7. As shown in FIGS. 1 and 2, a brushless AC generator 1 includes a stator 2, a rotor 3, a field winding 4, a front housing 51, a rear housing 52, a rectifier 6, a regulator 7 and a rear cover 8. The stator 2 having a stator core 21 and a stator winding 22 wound on the stator core 21 functions as an armature.

Figure 3:
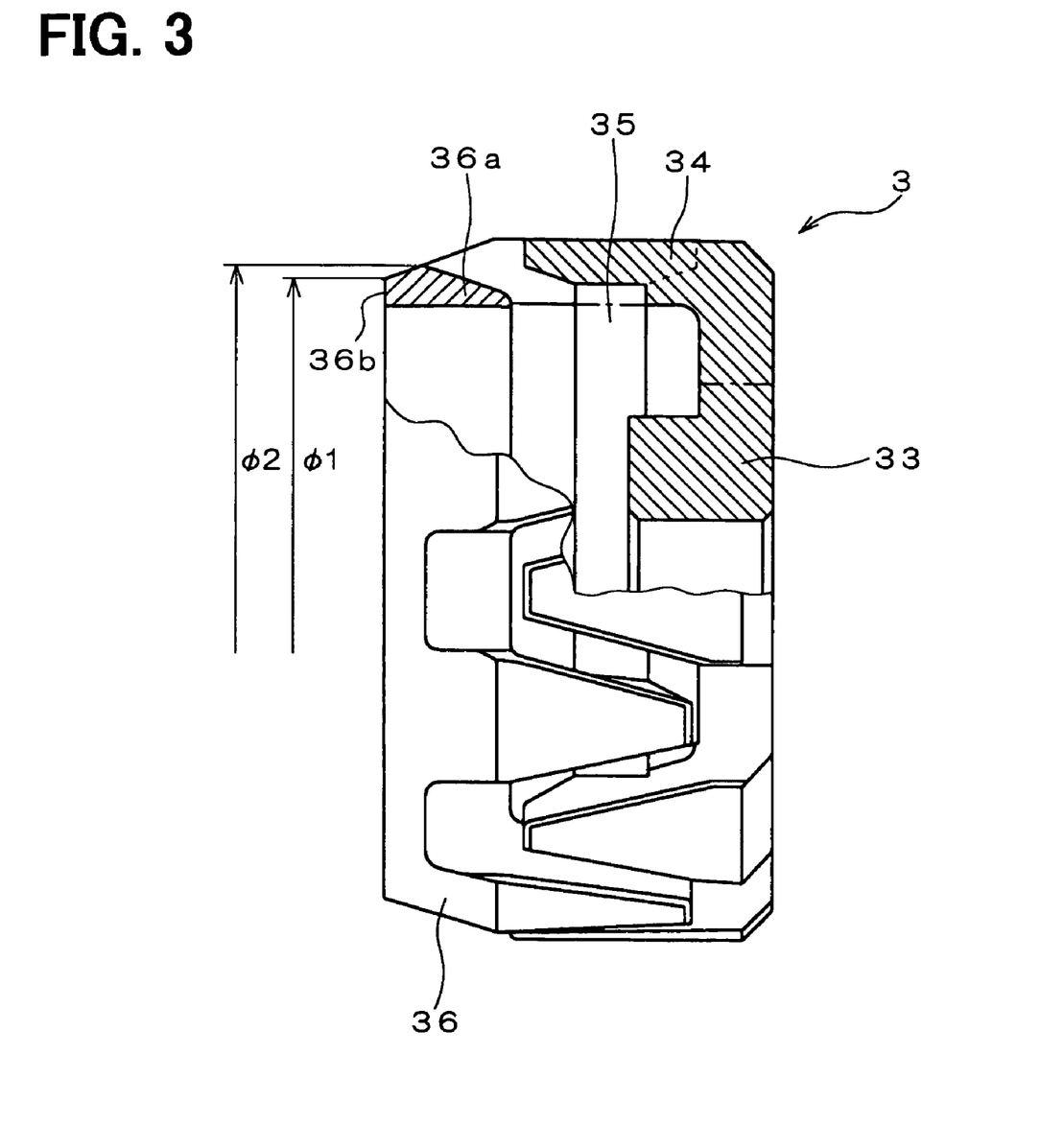
FIG. 3 is a side view (partially cross-sectioned) showing a rotor used in the generator.

The rotor 3 generates a magnetic field for the stator 2 and is rotatably disposed in the stator 2. As shown in FIGS. 1 and 3, the rotor 3 includes rotor yokes 32, 33 rotating together with a rotor shaft 31, claw-shaped rotor poles 34 integrally formed with the rotor yoke 33, and claw-shaped rotor poles 36 connected to the claw-shaped rotor yokes 34 by a ring-shaped support member 35. The claw-shaped rotor poles 36 are connected to each other in a circumferential direction, forming a ring-shaped shoulder portion 36a. The rotor shaft 31 is rotatably supported by a rear bearing 37 held in the rear housing 52 and a front bearing 38 held in the front housing 51. A field winding 4 is wound on a cylindrical yoke 41 that is fixedly connected to the rear housing 52 with bolts 42. A magnetic field generated by the field winding 4 is supplied to the rotor 3.

The stator 2 is fixedly held by the front housing 51 and the rear housing 52. One end of the rotor shaft 31 extends to the front side of the front housing 51, and a cooling fan 53 is connected to the extended portion of the rotor shaft 31 with a nut 54. A pulley (not shown in FIG. 1) is also connected to the extended portion of the rotor shaft 31.

The rectifier 6 having cooling fins and the regulator 7 are mounted on the rear housing 52. The rectifier 6 rectifies alternating current generated in the stator winding 22 into direct current. The regulator 7 controls an output voltage of the brushless AC generator 1 by controlling an amount of excitation current supplied to the field winding 4. The amount of excitation current is controlled by turning on or off the excitation current.

When the rotor 3 and the cooling fan 53 are rotated by the engine, cooling air is introduced into the generator through windows formed in the rear cover 8. The cooling air cools the rectifier 6 and the regulator 7, and then the cooling air is further introduced into the inner space of the generator through windows $52f$ (refer to FIG. 4) formed in the rear housing 52. The stator 2 and the rotor 3 are cooled by the introduced cooling air. Then, the cooling air is blown out from the front side of the generator 1.

Figure 4:
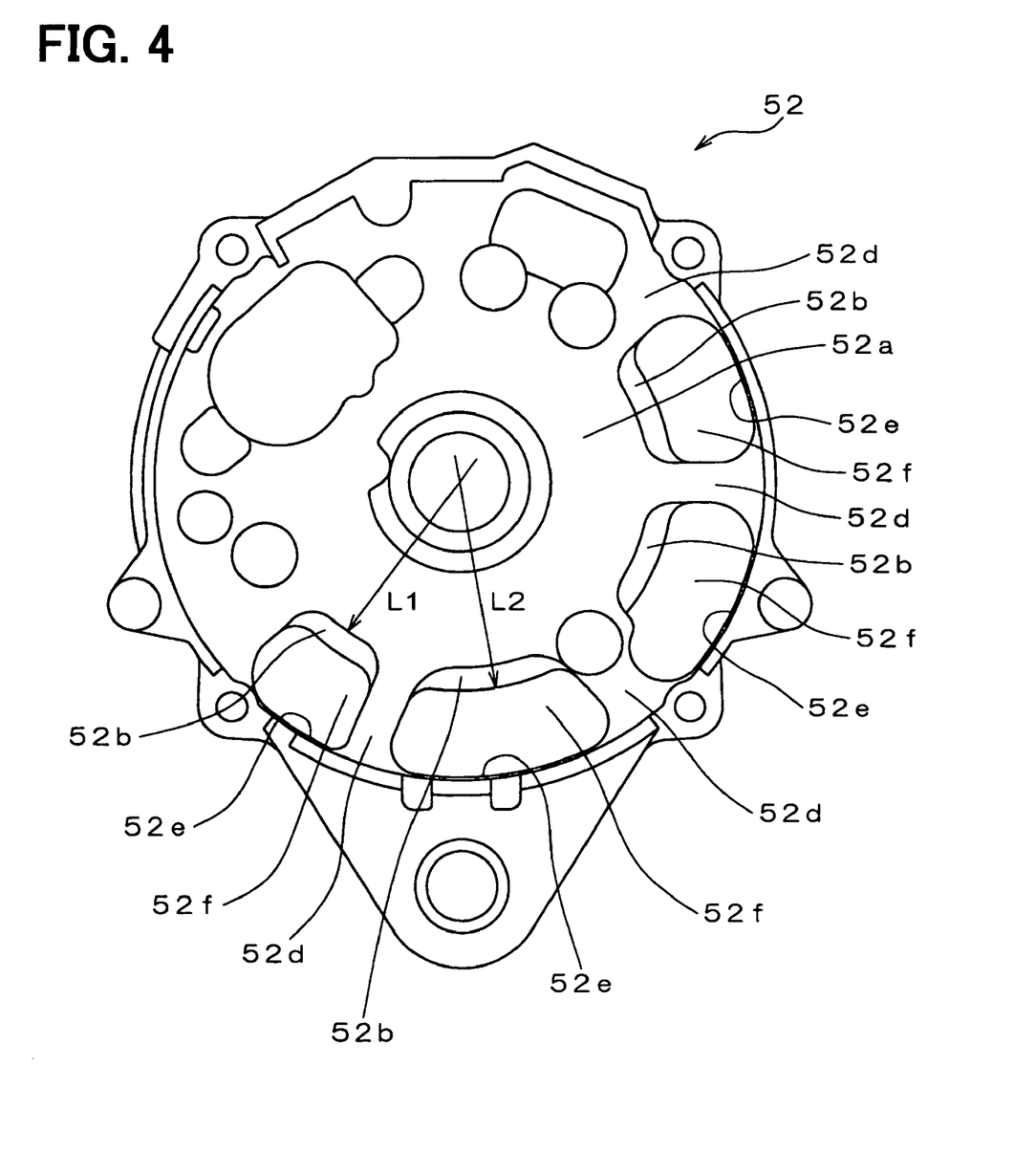
FIG. 4 is a plan view showing a rear housing used in the generator.

Now, the rear housing 52 and a relation between the rear housing 52 and the rotor 3 will be described in detail. As shown in FIG. 4, the rear housing 52 includes a disc portion 52a formed around a center hole, plural spokes 52d extending in the radial direction from the disc portion 52a, and a cylindrical portion 52e extending in the axial direction from the spokes 52d. The rectifier 6 is mounted on the rear surface of the disc portion 52a, while the cylindrical yoke 41 is connected on the front surface of the disc portion 52a. Plural windows $52f$ for introducing cooling air are defined by an outer peripheral end surface 52b of the disc portion 52a and spokes 52d.

Figure 5:
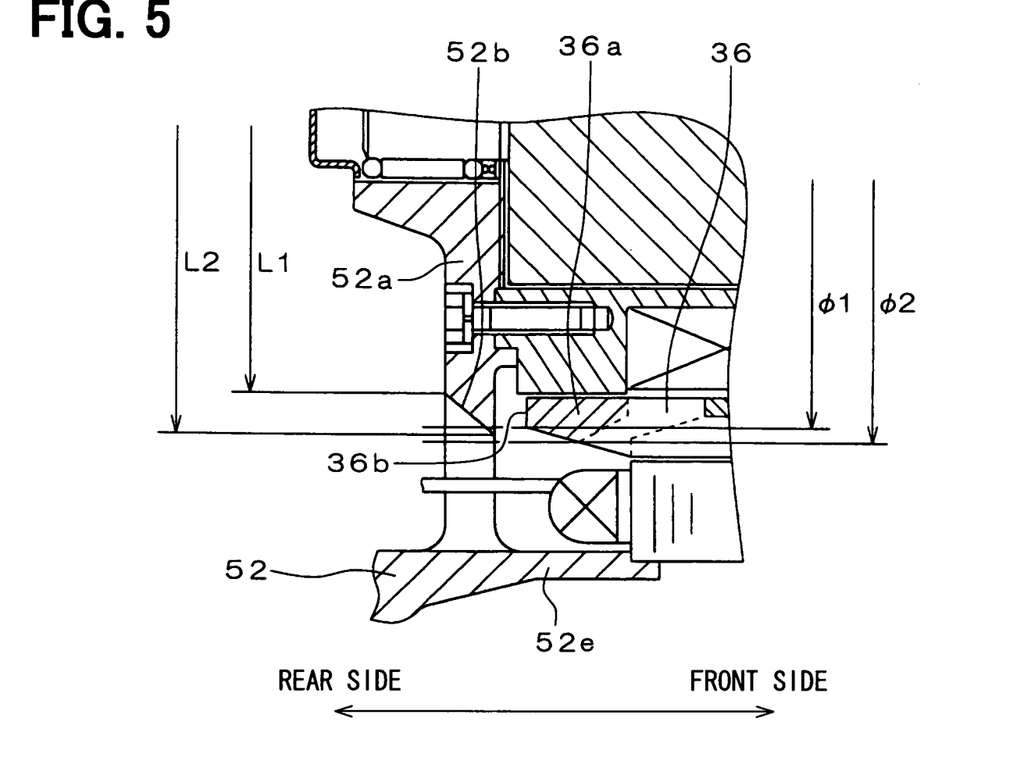
FIG. 5 is a partial cross-sectional view showing a relation between a disc portion of the rear housing and a shoulder portion of the rotor.

As shown in FIG. 5, the outer peripheral end surface 52b of the disc portion 52a, which forms an inner fringe of the window $52f$, is tapered. That is, its rear side diameter L1 is made smaller than its front side diameter L2 (L2>L1, also refer to FIG. 4). Further, the front side diameter L2 is made between an outer diameter $\Phi 1$ of a rear end surface of a shoulder portion 36a and an outermost diameter $\Phi 2$ of the shoulder portion 36a ($\Phi 1 \leq L2 \leq \Phi 2$). As shown in FIG. 3, the shoulder portion 36a of the rotor 3 is a ring-shaped portion connecting the claw-shaped rotor poles 36 in the circumferential direction.

Figure 6:
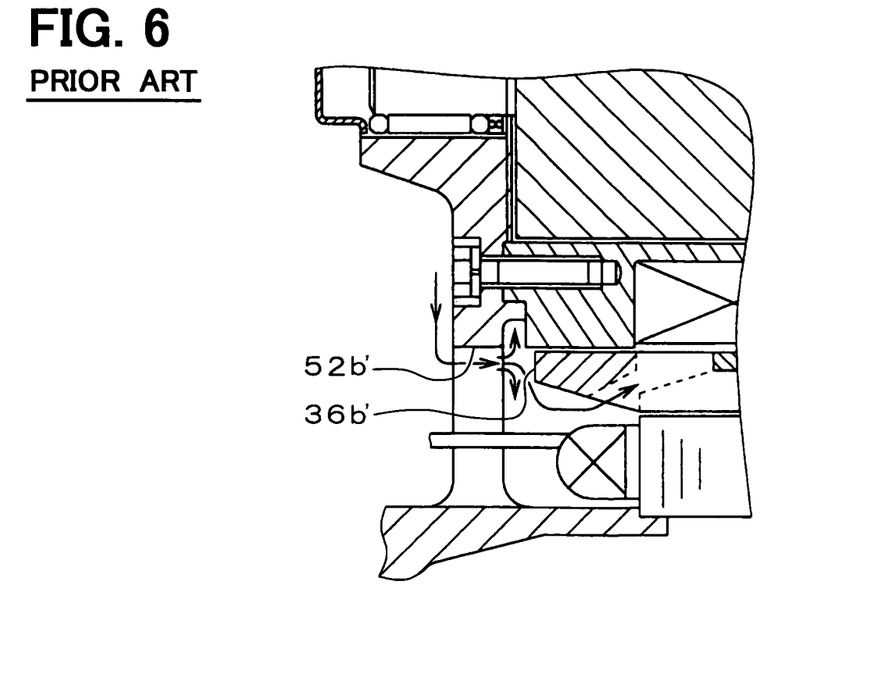
FIG. 6 is a partial cross-sectional view showing a relation between a disc portion of the rear housing and a shoulder portion of a rotor in a conventional brushless AC generator.

By forming the outer peripheral end surface 52b in the tapered shape as shown in FIG. 5, cooling air introduced inside the rear housing 52 smoothly flows in the axial direction. For further explain the advantage of the tapered surface, the structure according to the present invent shown in FIG. 5 is compared with that of a conventional structure shown in FIG. 6. In the conventional structure, a step is formed between an outer peripheral end surface $52b'$ and a rear end surface $36b'$. Therefore, cooling air introduced inside through a window does not flow smoothly because the step exists between $52b'$ and $36b'$, and the cooling air stagnates at the step portion, as shown in FIG. 6. Further, part of the cooling air enters into a gap formed between the disc portion of the rear housing and the rear end surface of the rotor.

Figure 7:
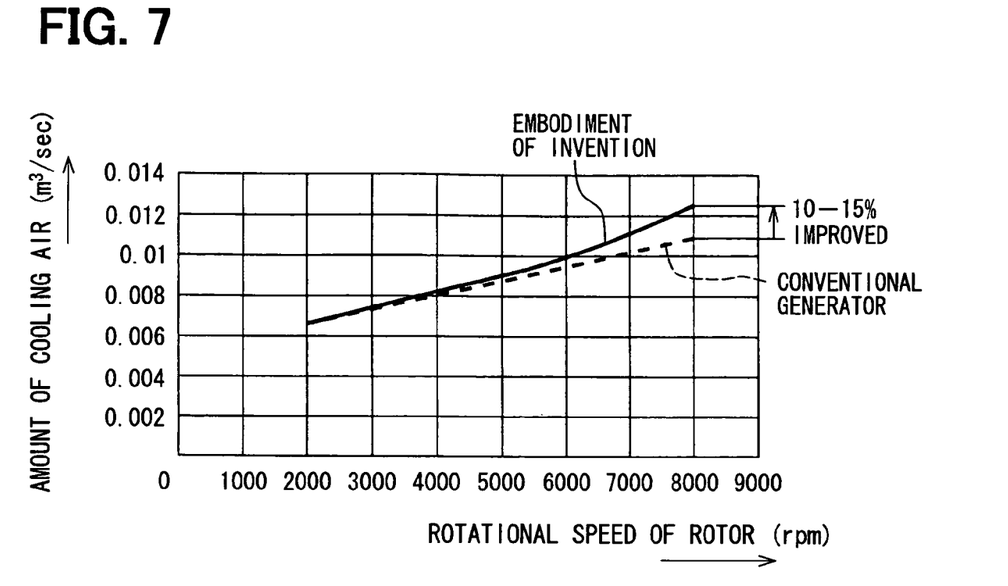
FIG. 7 is a graph showing an amount of cooling air versus rotational speed of the rotor of the brushless AC generator.

FIG. 7 shows a result of a comparison test between the conventional generator having the structure shown in FIG. 6 and the generator according to the present invention. Rotational speed of the rotor is shown on the abscissa and an amount of cooling air on the ordinate. A solid line shows the amount of cooling air in the generator according to the present invention, while a dotted line shows that of the conventional generator. As seen in the graph, an amount of the cooling air increases 10-15% at a high speed region by applying the present invention.

The shape of the outer peripheral end surface 52b may be variously modified to attain the same or similar advantage as that attained in the embodiment described above. Some modified forms will be described below with reference to FIGS. 8-11.

Figure 8:
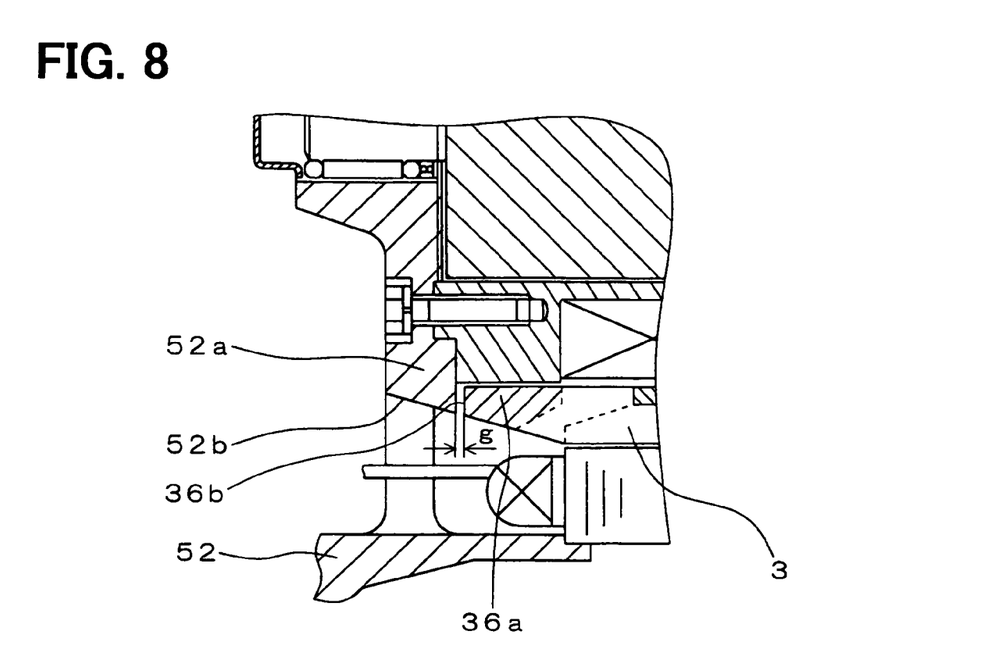
FIG. 8 is a similar view as shown in FIG. 5, showing a modified form 1 of the embodiment of the present invention.

In a modified form 1 shown in FIG. 8, a thickness of the disc portion 52a is increased at a portion close to the outer peripheral end surface 52b, so that a gap "g" between the front surface of the disc portion 52a and the rear end surface 36b of the shoulder portion 36a becomes small. The slope of the outer peripheral end surface 52a is made to coincide with the slope of the shoulder portion 36a. In this manner, the cooling air flows into the generator 1 further smoothly, avoiding stagnation of the cooling air flow.

Figure 9:
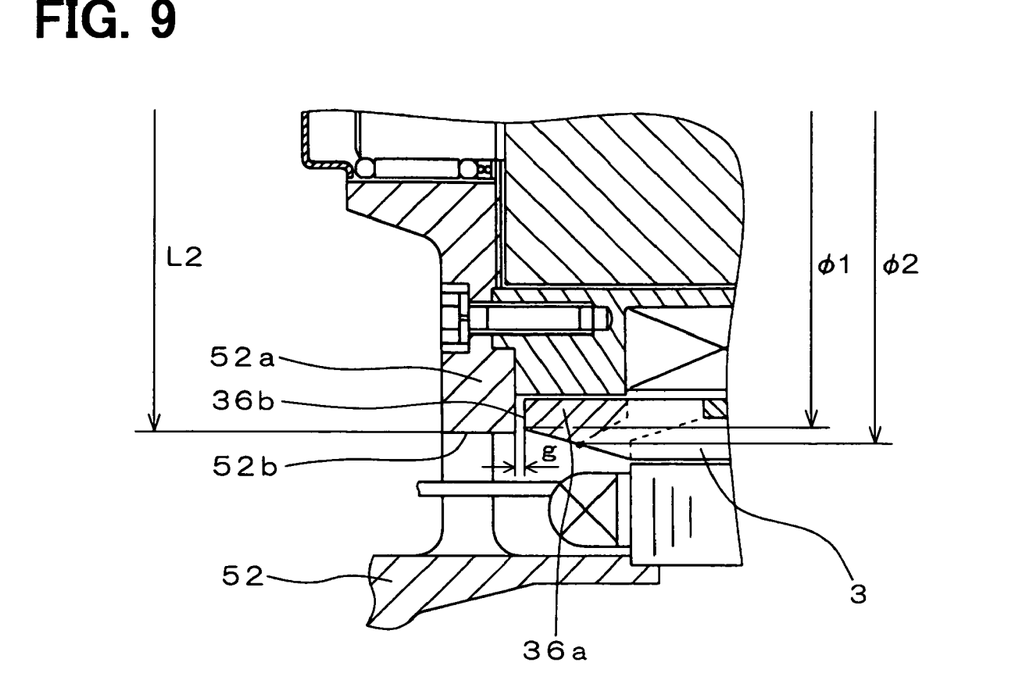
FIG. 9 is a similar view as shown in FIG. 5, showing a modified form 2 of the embodiment of the present invention.

FIG. 9 shows a modified form 2. In this modified form, the outer peripheral end surface 52b is made parallel to the axial direction (not tapered), and the gap g is narrowed in the same manner as in the modified form 1. The diameter L2 is made to fall between the diameter $\Phi 1$ and the diameter $\Phi 2$ ($\Phi 1 \leq L2 \leq \Phi 2$). In this manner, disturbance of the cooling air flow caused by hitting the rear end surface 36b is reduced, thereby improving cooling efficiency. By making the gap g smaller, the cooling air and water entering inside the claw-shaped rotor poles 36 can be reduced, thereby preventing formation of rust on the rotor 3.

Figure 10:
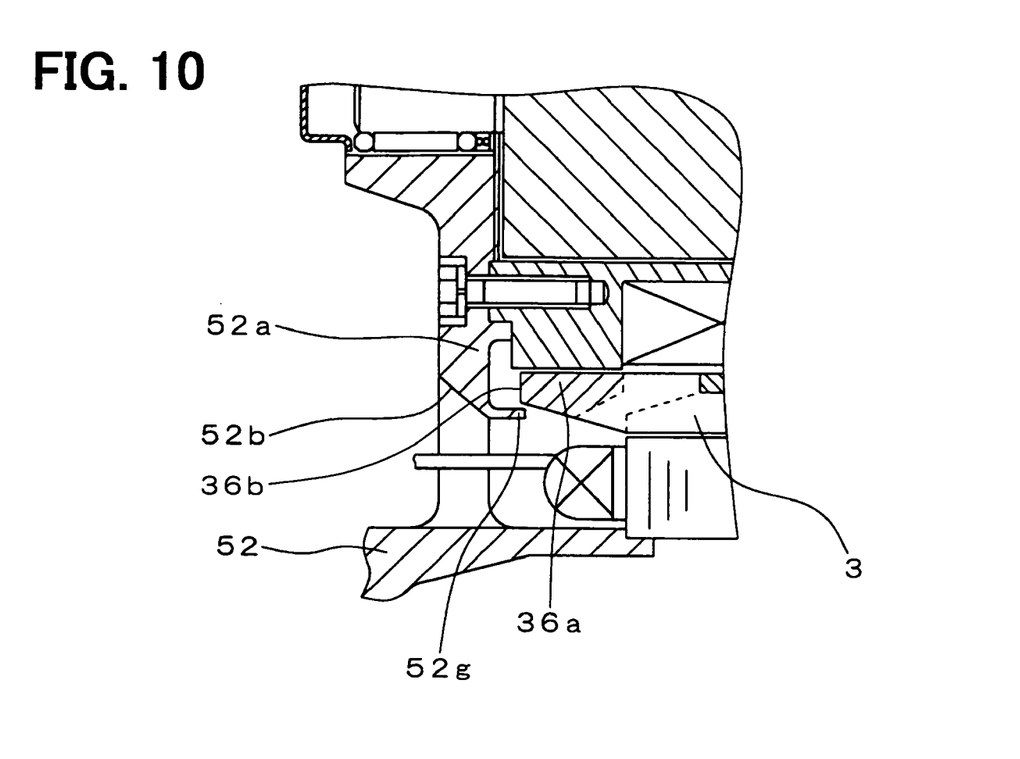
FIG. 10 is a similar view as shown in FIG. 5, showing a modified form 3 of the embodiment of the present invention.

FIG. 10 shows a modified form 3. In this modified form, a projected portion 52g is additionally formed on the outer peripheral end surface 52b which is tapered. The projected portion 52g extends in the axial direction beyond the rear end surface 36b of the shoulder portion 36a, making a small gap between 52g and 36b. In this manner disturbance in the airflow is alleviated, and the air and water are prevented from entering an inside portion of the rotor 3.

Figure 11:
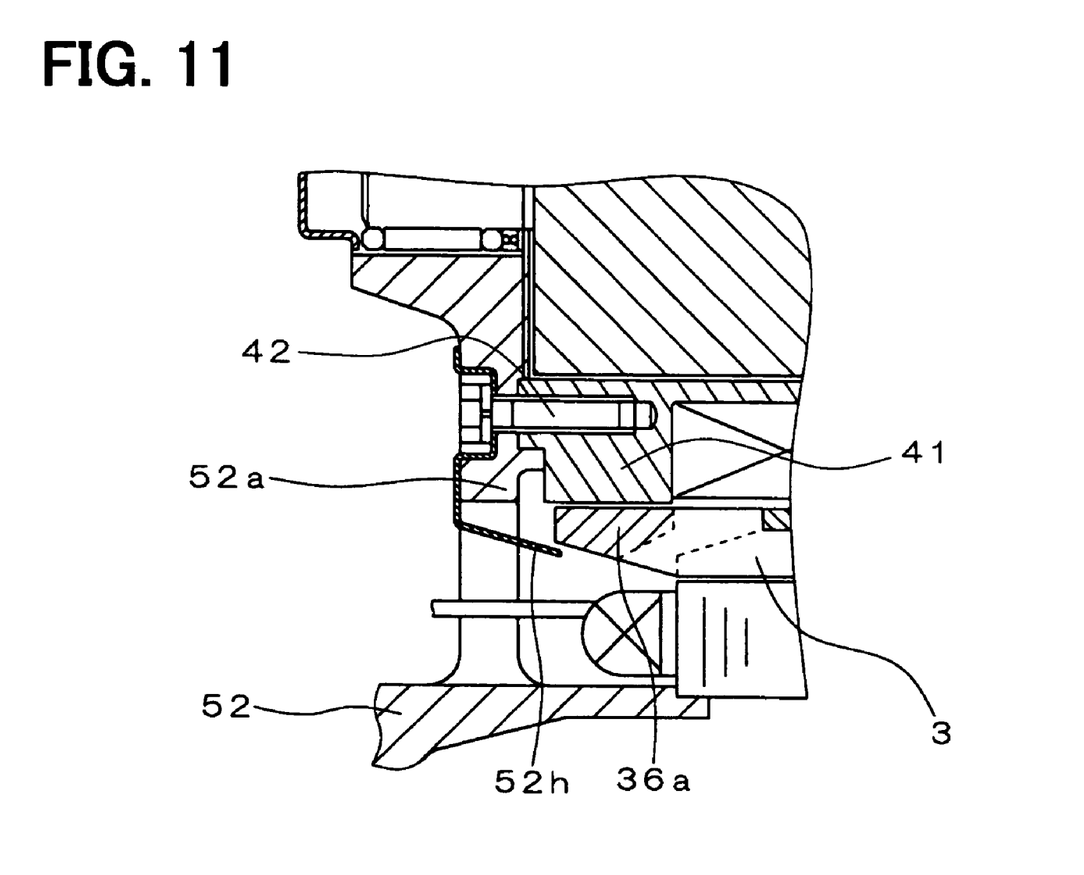
FIG. 11 is a similar view as shown in FIG. 5, showing a modified form 4 of the embodiment of the present invention.

FIG. 11 shows a modified form 4. In this modified form, a cover member 52h having a tapered surface is connected to the disc portion 52a by the bolt 42 that connects the yoke 41 to the disc portion 52a. Namely, the cover member 52h is made separately from the rear housing 52 and connected thereto by the bolt 42. The tapered portion of the cover member 52h overlapping with the tapered surface of the shoulder portion 36a may be shortened not to overlap therewith.

While the present invention has been shown and described with reference to the foregoing preferred embodiment and modified forms, it will be apparent to those skilled in the art that changes in form and detail may be made therein without departing from the scope of the invention as defined in the appended claims. For example, though the diameter L2 is set to fall in a range between $\Phi 1$ and $\Phi 2$ as shown in FIG. 5, it may be possible to set the diameter L2 smaller than $\Phi 1$. The tapered surface improves smoothness of the cooling airflow in this case, too.

What is claimed is:

1. A brushless AC generator comprising:
   a housing composed of a front housing and a rear housing;
   a stator having a stator winding for generating alternating current, the stator being fixedly disposed in the housing;
   a rotor having a rotor shaft rotatably supported in the stator;
   a field winding for supplying a magnetic field to the rotor, the field winding being held in a yoke connected to the rear housing; and
   a rectifier for rectifying the alternating current generated in the stator to direct current, the rectifier being mounted on the rear housing, wherein:
   the rear housing comprises a disc portion having a plane perpendicular to the rotor shaft and an outer peripheral end surface, spokes extending from the disc portion in a radial direction, a cylindrical portion connected to an outer periphery of the spokes, and windows for introducing cooling air into the housing, the windows being defined by the outer peripheral end surface of the disc portion, the spokes and the cylindrical portion;
   the outer peripheral end surface of the disc portion is tapered with respect to the axial direction of the rotor shaft to satisfy a formula: L2>L1, where L2 is a diameter of the outer peripheral end surface at a front side of the disc portion, and L1 is a diameter of the outer peripheral end surface at a rear side of the disc portion;
   the rotor has a shoulder portion including a rear end surface, the shoulder portion connecting plural claw-shaped rotor poles in a circumferential direction of the rotor;
   the rear end surface of the shoulder portion is positioned to face the front side of the disc portion;
   the diameter L2 is made to satisfy a formula: $\Phi 1 \leqq L2 \leqq \Phi 2$, where $\Phi 1$ is an outer diameter of the rear end surface of the shoulder portion, and $\Phi 2$ is a diameter of an outermost portion of the shoulder portion; and
   the outer peripheral end surface of the disc portion includes a projected portion projected toward the rotor beyond the rear end surface of the shoulder portion.

2. The brushless AC generator as in claim 1, wherein the projected portion is a member that is made separately from the disc portion.

\* \* \* \* \*